(No Model.)

R. HOFFMAN.
BICYCLE BRAKE.

No. 601,197. Patented Mar. 22, 1898.

WITNESSES

INVENTOR
Robert Hoffman

UNITED STATES PATENT OFFICE.

ROBERT HOFFMAN, OF ALLEGHENY, PENNSYLVANIA.

BICYCLE-BRAKE.

SPECIFICATION forming part of Letters Patent No. 601,197, dated March 22, 1898.

Application filed November 27, 1896. Serial No. 613,473. (No model.)

*To all whom it may concern:*

Be it known that I, ROBERT HOFFMAN, of Allegheny, in the county of Allegheny and State of Pennsylvania, have invented a new and useful Improvement in Bicycle-Brakes, of which the following is a full, clear, and exact description, reference being had to the accompanying drawings, forming part of this specification, in which—

Figure 1:
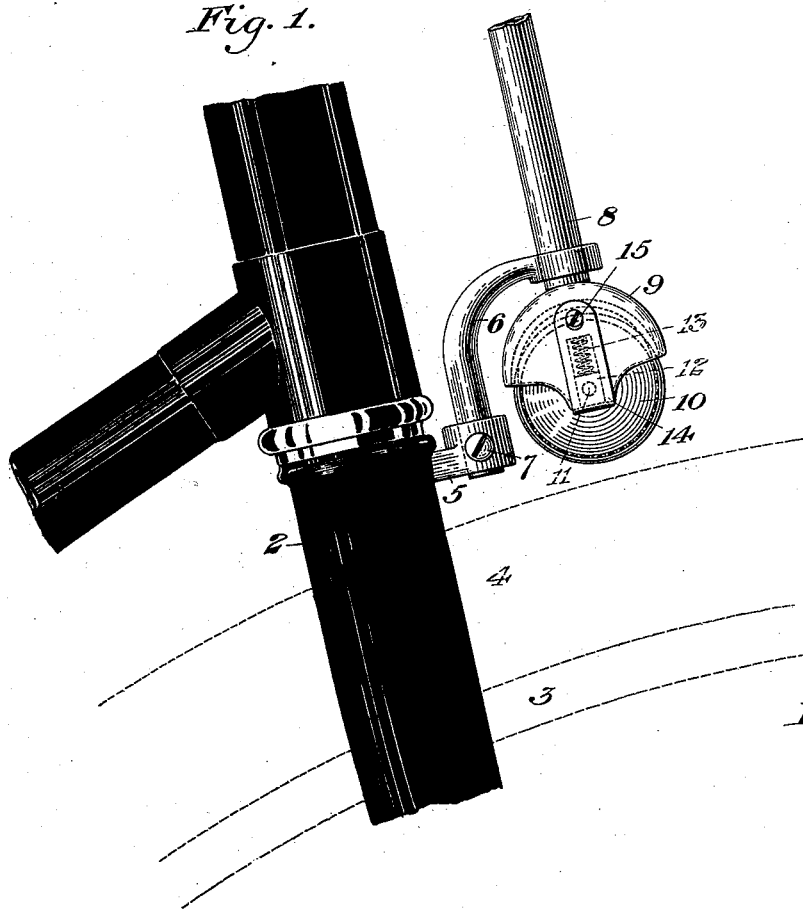
Figure 3:
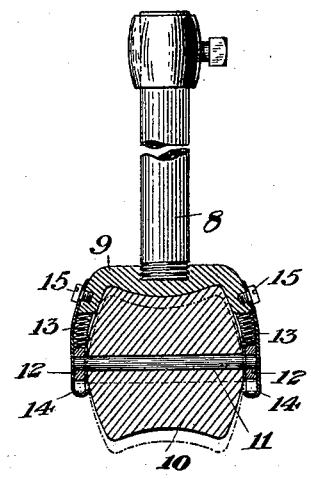
Figure 2:
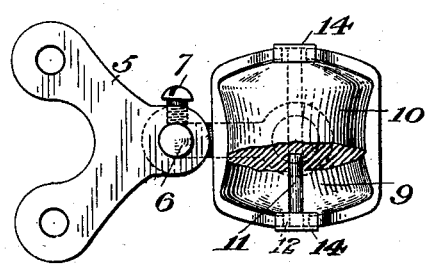

Figure 1 is a side elevation of a portion of a bicycle with my improved brake in place. Fig. 2 is a bottom plan view of the brake and attaching-bracket, the roller being partly broken away; and Fig. 3 is a vertical central section of the same.

My invention relates to the brakes employed for wheels, and more especially those having yielding tires, such as bicycle-wheels, and is designed to provide a brake for this purpose which may be readily applied to any bicycle and which shall operate efficiently to retard the rotation of the wheels without the injurious effect upon the tire consequent upon the use of a rigid spoon or shoe.

To that end it consists in an improved arrangement of one or more rollers, arranged to bear upon the wheel or its tire, and a brake or friction surface which is applied to a portion of the outer surface of the roller or rollers not contacting with the wheel or tire.

It also consists in an improved adjustable bracket, as well as in the construction and arrangement of the parts, as hereinafter more fully described, and set forth in the claims.

In the drawings, in which similar numerals indicate corresponding parts, 2 represents the fork, 3 the wheel-rim, and 4 the pneumatic or yielding tire, of a bicycle.

5 is a bracket, preferably of forked shape, as shown in Fig. 2, which is secured by suitable screws to the frame, between the forks, and in a hole in which is adjustably secured the curved guide 6, this guide being held in adjusted position by a set-screw 7. Through a hole in the guide passes the brake-rod 8, to the lower end of which is secured a hollow housing 9, which is internally shaped to correspond to the external contour of a roller 10. This roller is carried loosely upon a shaft 11, mounted in bearing-blocks 12, fitted within side slots in the housing, the blocks 12 being normally forced downwardly by springs 13, so as to bear against the lower ends of clips 14, secured to the ends of the housing by screws 15. These clips are preferably made of plates of steel, having at their lower ends inwardly-reflexed lips which fit around the lower edges of the housing and serve to cover the springs and the ends of the shaft 11 and to exclude dirt.

The surface of the roller is preferably concaved, as shown, and its end faces are inclined, so that when the brake is released these end faces will quickly drop away from the contacting inner end faces of the housing.

In using the brake the rider, moving the brake-rod downwardly, presses the roller upon the tire and causes the roller, which normally rests in the position shown in dotted lines in Fig. 3, to move upwardly within the housing and contact therewith both upon its periphery and end faces. The friction thus exerted upon the roller by the housing, which acts as a brake therefor, will retard its rotation, and hence retard the movement of the wheel, the braking-friction thus being brought upon the roller and the tire relieved of the tearing or abrading action of such friction. The end pressure of the housing upon the roller is of importance because it gives better frictional action and causes less injury to the roller than pressure applied at any other point. I prefer also that the housing should bear against the roller not only at the ends, but on the periphery as well.

The housing, as also the brake-rod, I preferably make of aluminium to give lightness, and I preferably make the roller of vulcanized rubber, though other materials may be used for these parts or their wearing-faces.

The advantages of my invention result from the interposition between the brake proper and the wheel of a roller, upon the outer face of which the brake, in this case the housing, bears, since a brake of as great power and efficiency as before is obtained, and that with very few parts, of simple construction. The bracket, moreover, is simple and advantageous, as it may be applied to any wheel by reason of the adjustability of the guide therein.

Many changes in the form of the roller and the braking-surface therefor may be made without departure from my invention, since

What I claim is—

1. The combination of the roller, a housing therefor, bearing-blocks fitted within side slots in the housing, springs for the bearing-blocks, and cover-plates or clips having flanges arranged to retain the bearing-blocks in place.

2. The combination of the roller, a housing therefor, bearing-blocks fitted within the slots in the housing, springs for the bearing-blocks, and cover-plates or clips, having at their ends lips which fit the edge of the housing.

3. A guide for brake-rods, comprising a bracket at one side and out of alinement with the brake-rod, means for removably securing the same to the frame, and a guide adjustably secured in the bracket.

4. A guide for brake-rods comprising a bracket at one side of and out of alinement with the brake-rod and having holes for securing the same to the under side of the fork, a curved guide adjustable within a hole in the bracket, and means for securing the guide therein in any adjusted position.

In testimony whereof I have hereunto set my hand.

ROBERT HOFFMAN.

Witnesses:
G. I. HOLDSHIP,
H. M. CORWIN.